US006488051B2

(12) United States Patent
Fagerström

(10) Patent No.: US 6,488,051 B2
(45) Date of Patent: Dec. 3, 2002

(54) HYGIENIC SEALING PLATE FOR VALVE ASSEMBLY

(75) Inventor: Peter Fagerström, Huddinge (SE)

(73) Assignee: AB Rexroth Mecman (SE)

( * ) Notice: Subject to any disclaimer, the term of this patent is extended or adjusted under 35 U.S.C. 154(b) by 0 days.

(21) Appl. No.: 09/800,458

(22) Filed: Mar. 4, 2001

(65) Prior Publication Data

US 2001/0047835 A1 Dec. 6, 2001

(30) Foreign Application Priority Data

Mar. 6, 2000 (DE) ........................................ 100 12 067

(51) Int. Cl.[7] ................................................ F16K 27/00
(52) U.S. Cl. ....................................... 137/884; 277/609
(58) Field of Search ......................... 137/884; 251/367; 277/609, 626, 630, 644

(56) References Cited

U.S. PATENT DOCUMENTS 5,086,803 A * 2/1992 Nakajima ................... 137/270
5,680,883 A * 10/1997 Gluf, Jr. ..................... 137/884
5,893,394 A * 4/1999 Meloche ..................... 137/884

FOREIGN PATENT DOCUMENTS

| | | |
|---|---|---|
| DE | 36 37 830 | 5/1988 |
| DE | 41 43 274 | 8/1993 |
| DE | 42 22 637 | 1/1994 |
| DE | 44 13 657 | 4/1994 |
| EP | 0 688 958 | 5/1995 |

OTHER PUBLICATIONS

Catalogue “Know–how in Pneumatics”.

* cited by examiner

*Primary Examiner*—John Fox
(74) *Attorney, Agent, or Firm*—Reed Smith LLP; Michael I. Wolfson

(57) ABSTRACT

The present invention provides a valve assembly, comprising a multiway valve (9) with a fitting surface (10) and a fluid manifold (7) with a mounting surface (8), wherein an opening of at least one branch channel lies opposite an opening of a respective channel of the multiway valve (9) in order to provide a fluid connection between the fluid manifold (7) and the multiway valve (9), and with an elastic sealing plate (1) with a plate-like body and through holes (2*a*–2*e*, 3*a*–3*d*) for the openings disposed between the mounting surface (8) and the fitting surface (10) and covering approximately completely the fitting surface (10) of the assigned multiway valve (9), wherein each through hole (2*a*–2*e*, 3*a*–3*d*) is surrounded by an annular sealing lip (4) formed on the elastic sealing plate (1), wherein the elastic sealing plate (1) is provided with an outer hygienic sealing profile (5) formed along the edge (6) on both sides of the sealing plate (1) in order to avoid a capillary entry of dirt and bacteria into the area between the multiway valve (9) and the fluid manifold (7).

6 Claims, 3 Drawing Sheets

Fig.1
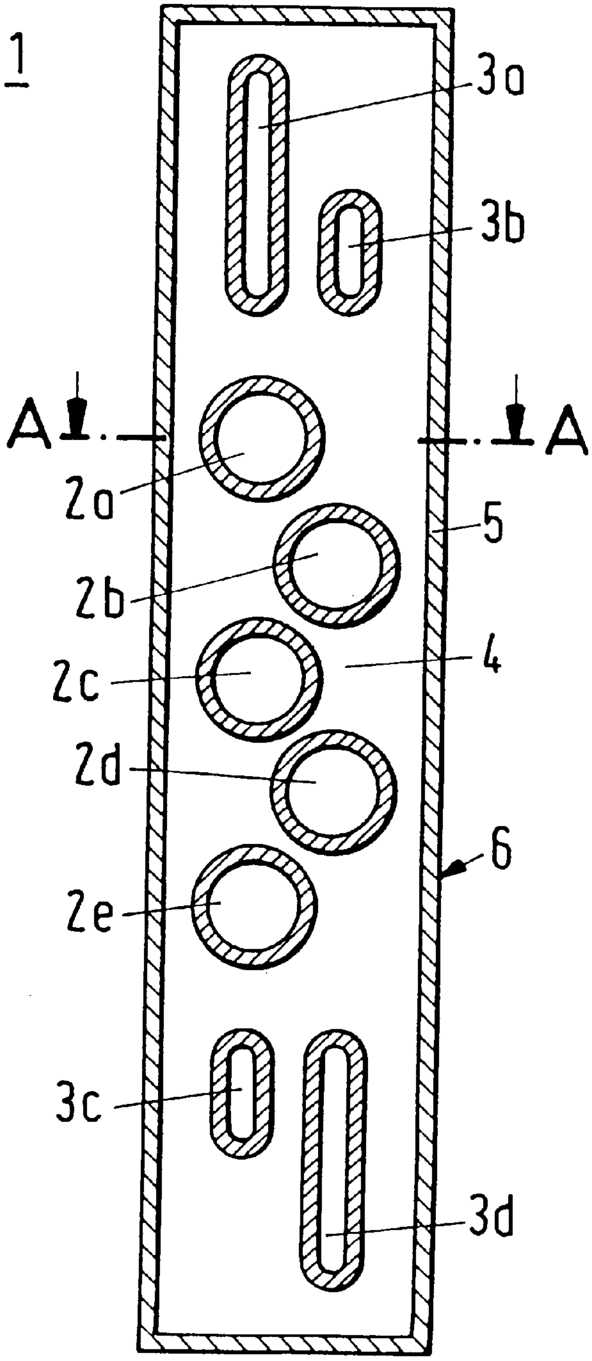

Fig.2a
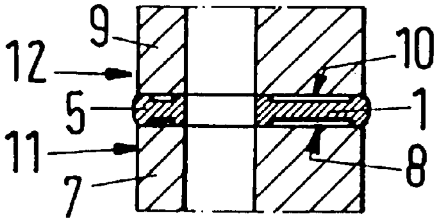
Fig.2b
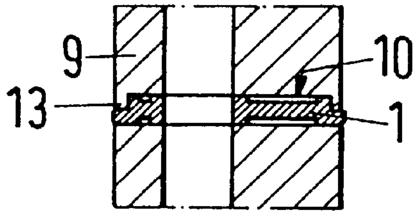
(B-B)
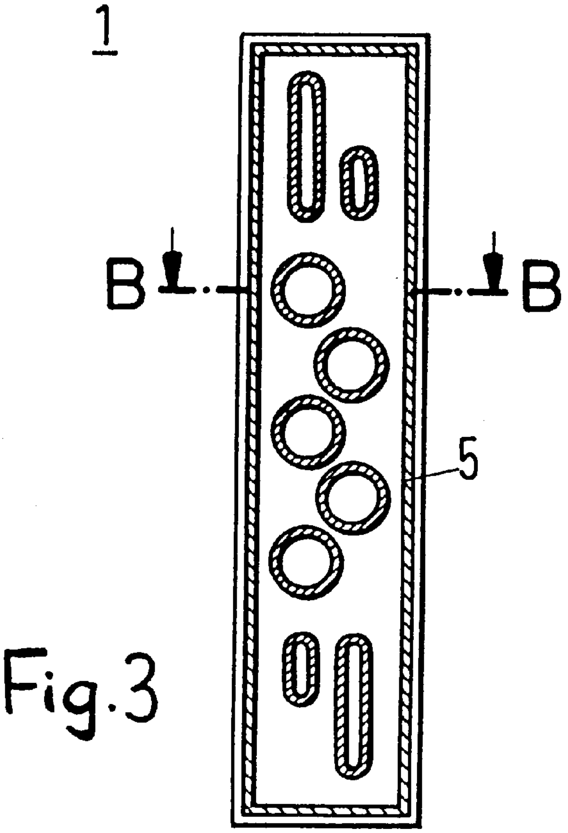
Fig.3

(C)

HYGIENIC SEALING PLATE FOR VALVE ASSEMBLY

FIELD OF THE INVENTION

The present invention relates to a valve assembly for controlling the fluid flow of a pressure medium. More particularly, the present invention relates to a sealing plate disposed between a multiway valve and a fluid manifold of said valve assembly. Especially, the invention-relates to a sealing solution in environments where a high hygienic standard is required.

DESCRIPTION OF RELATED ART

A valve assembly is known from document EP 0 688 958 A1. The disclosed valve assembly comprises a fluid manifold which is provided with a mounting surface. The mounting surface corresponds with a fitting surface of a neighbouring multiway valve in order to connect the fluid ports of both parts for supplying and ejecting the valve assembly. For that reason the fluid manifold comprises a supply channel and one or more ejecting channels, wherein transverse branch channels run form these channels to the mounting surface. On the mounting surface an opening of each branch channel lies opposite an opening of a valve channel.

Furthermore, the valve assembly comprises a sealing element disposed between the mounting surface of the fluid manifold and the fitting surface of the multiway valve. The sealing element surrounds the respective opposite openings of the branch channels and the valve channels. The sealing element is shaped as an elastic sealing plate with a plate-like body covering approximately completely the fitting surface of the fitted multiway valve The sealing element has through holes which correspond with the openings of the branch channels and the valve channels. Each of these trough holes is surrounded by an annular sealing lip formed on the plate-like body of the sealing plate.

As shown in FIG. 3 of the above-mentioned prior art document the valve arrangement has in its mounted state a small outer gap between the multiway valve and a fluid manifold. Said gap allows dirt and bacteria to get into the area between both mounting parts where the sealing plate is disposed. This is undesirable in environments where a high hygienic standard is required. Because of the gaps it is very difficult to keep the valve arrangement clean enough.

It is the aim of the present invention to provide a valve arrangement which in contrast to the prior art provides a hygienic connection between a multiway valve and a fluid manifold.

SUMMARY OF THE INVENTION

This aim is obtained in a valve assembly of the above-mentioned kind by including an elastic sealing plate with a special hygienic outer sealing profile formed along the edge on both sides of the sealing plate.

So the present invention avoids an undesired capillary entry of dirt and bacteria into the area between the multiway valve and the fluid manifold. The sealing plate of the invention provides a functional integration through sealing openings of corresponding channels on the one hand and seal the outer gap between said two mounting parts on the other hand without using separate sealing elements.

In one preferred embodiment of the invention the side surface of the fluid manifold is disposed on the same plane as the side surface of the multiway valve. In this case the sealing profile is substantially shaped like a rectangle in the normal state and takes a convex shape in the mounted state in order to avoid sharp edges between the mounting parts.

In another preferred embodiment of the invention the side surface of the fluid manifold is disposed approximately rectangular to the side surface of the multiway valve. In this case the sealing profile is substantially shaped like a concave lip in the mounted state in order to avoid sharp edges between the mounting parts. It can be useful that the concave lip of the sealing profile comprises on its tip a slanting contour for pressing the tip of the lip on the respective surface of one mounting part.

As a further advantageous development of the invention two concave lips of neighbouring multiway valves form a u-shaped groove between the two multiway valves. The u-shaped groove provides an easy water-run-off when cleaning the valve assembly.

It is an additional favourable effect of the invention that along the edge of the mounting surface or the fitting surface of the fluid manifold and the multiway valve a fixing section for holding the sealing plate in the desired position is formed respectively. Furthermore, the elastic sealing plate could contain a reinforcing element made by metal or plastics material or another suitable material in order to stabilise the sealing plate.

The foregoing and other aspects will become apparent from the following detailed description of the invention when considered in conjunction with the enclosed drawings.

BRIEF DESCRIPTION OF THE DRAWINGS

FIG. 1 is a front view together with a cross sectional view A—A of a sealing plate according to a first embodiment of the invention.

FIG. 2*a* is a cross sectional view of a valve assembly in the mounted state with the sealing plate of FIG. 1.

FIG. 2*b* is a cross sectional view of another valve assembly in the mounted state with the sealing plate of FIG. 1.

FIG. 3 is a front view together with a cross sectional view B—B of a sealing plate according to a second embodiment of the invention.

DESCRIPTION OF THE PREFERRED EMBODIMENT

Figure 3A:
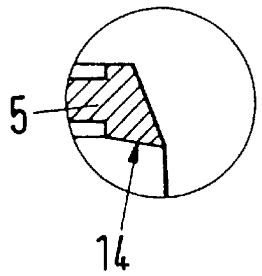
FIG. 3*a* is an enlarged view of section C in FIG. 3.

A sealing plate 1 shown in FIG. 1 has a plate-like body and through holes 2*a* to 2*e* and 3*a* to 3*d* for respective openings in the mounting parts. Each through hole 2*a* to 2*e* and 3*a* to 3*d* is surrounded by an annular sealing lip 4 formed on both sides of the elastic sealing plate 1. In this embodiment the through holes 2*a* to 2*e* serve as a sealed connection for channels of the main part of a multiway valve. The through holes 3*a* to 3*d* provide a sealed connection for the pilot valve part of the multiway valve. The sealing plate 1 is also provide with an outer sealing profile 5 formed along an edge 6 on both sides of the sealing plate 1 as shown in the cross sectional view A—A.

The sealing plate 1 is a part of a valve assembly as shown schematically in FIG. 2*a.* The valve assembly comprises a fluid manifold 7 with a mounting surface 8 to which a multiway valve 9 with a fitting surface 10 is fitted. The sealing plate 1 is disposed between the mounting surface 8 and the fitting surface 10 covering completely the mounting surface 8 and the fitting surface 10. The side surface 11 of the fluid manifold 7 is disposed on the same plane as the side surface 12 of the multiway valve 9. The sealing profile 5 which is substantially shaped like a rectangle in its normal state takes a convex shape in the mounted state in order to avoid sharp edges and gaps between the mounting parts. In FIG. 2*b* the multiway valve 9 has along its edge on the fitting surface 10 a fixing section 13 for holding the sealing plate 1 in the desired position.

In a second embodiment of the sealing plate 1 as shown in FIG. 3 and FIG. 3*a* (enlarged view of section C) the contour of the sealing profile 5 is diagonal shaped. Furthermore, the sealing profile 5 comprises on its tip a slanting contour 14 for pressing the tip of the lip on the surface of one mounting part.

Figure 4:
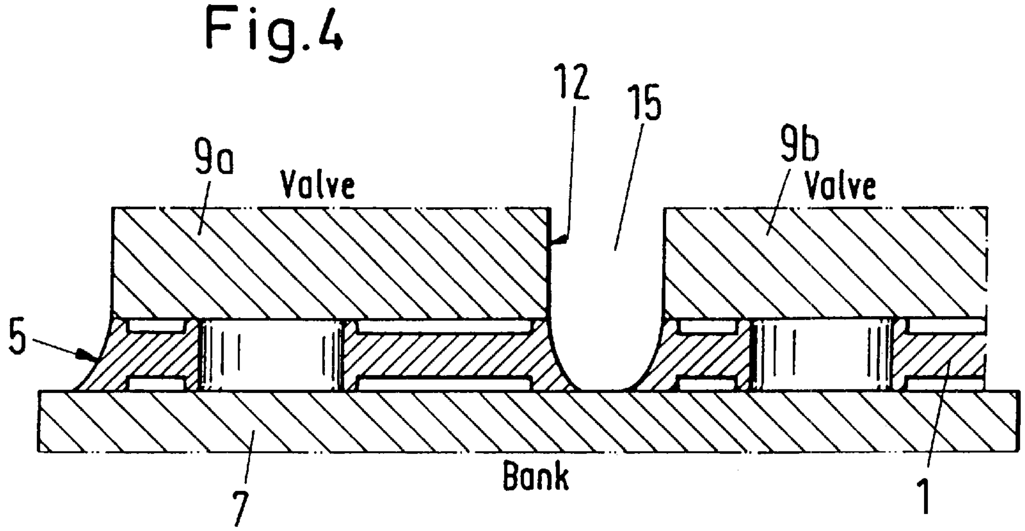
FIG. 4 is a cross sectional view of a valve assembly with two neighbouring multiway valves in the mounted state with the sealing plate of FIG. 3

FIG. 4 shows the sealing profile 5 in the mounted state. In the mounted state the fluid manifold 7 is disposed approximately rectangular to the side surface 12 of the multiway valve 9*a* or 9*b*. In this position the sealing profile 5 is shaped like a concave lip in order to avoid sharp edges and gaps between the two mounting parts. Two concave lips of neighbouring multiway valves 9*a* and 9*b* form an u-shaped groove 15 between the two multiway valves 9*a* and 9*b*. The u-shaped groove 15 provides an easy water-run-off when cleaning the valve arrangement.

Elastic sealing plate 1 may be fabricated by including a reinforcing element made of metal or a plastic material. Sealing plate 1 may be a transfer-molded part or element. In an additional embodiment of the invention, one or both of the mounting surface 8 of the fluid manifold 7 and the fitting surface 10 of the multiway valve 12 may be formed with a projecting or fixing section 13 for engaging the sealing plate 1 for holding sealing plate 1 in the desired position.

The invention is not limited by the embodiments described above which are presented as examples only but can be modified in various way within the scope of protection defined by the appended patent claims.

What is claimed is:

1. A valve assembly, comprising a multiway valve with a fitting surface and a fluid manifold with a mounting surface, wherein at least one opening of fluid channels inside the fluid manifold lies opposite an opening of a channel of the multiway valve in order to provide a fluid connection between the fluid manifold and the multiway valve, and with an elastic sealing plate with a plate-like body and through holes for the openings disposed between the mounting surface and the fitting surface and covering approximately completely the fitting surface of the assigned multiway valve, wherein each through hole is surrounded by an annular sealing lip formed on the elastic sealing plate, characterized in that the elastic sealing plate is provided with an outer hygienic sealing profile formed along the edge on both sides of the sealing plate in order to avoid a capillary entry of dirt and bacteria into the area between the multiway valve and the fluid manifold, and further characterized in that the fluid manifold is disposed approximately rectangular to the side surface of the multiway valve, and the sealing profile is substantially shaped like a concave lip in the mounted state in order to avoid sharp edges and gaps between the mounting parts.

2. A valve assembly according to claim 1, characterized in that two concave lips of neighboring multiway valves form a u-shaped groove between the two multiway valves.

3. A valve assembly according to claim 1, characterized in that the lip of the sealing profile comprises on its tip a slanting contour for pressing the tip of the lip on the surface of one mounting part in order to obtain a concave form.

4. A valve assembly according to claim 1, characterized in that the elastic sealing plate contains a reinforcing element made of metal or plastics material.

5. A valve assembly according to claim 1, characterized in that along the edge of the mounting surface or the fitting surface of the fluid manifold and the multiway valve a fixing section for holding the sealing plate in the desired position is formed respectively.

6. A valve assembly according to claim 1, characterized in that the sealing plate is a transfer-molded part.

* * * * *